April 29, 1941.   M. H. KUHNER   2,239,895
WASTE HEAT BOILER
Filed Dec. 15, 1938   2 Sheets-Sheet 1

Inventor
MAX H. KUHNER
By Albert G. Blodgett
Attorney

April 29, 1941.                    M. H. KUHNER                    2,239,895
                                  WASTE HEAT BOILER
                              Filed Dec. 15, 1938            2 Sheets-Sheet 2

Inventor
MAX H. KUHNER
By Albert G. Blodgett
Attorney

Patented Apr. 29, 1941

2,239,895

UNITED STATES PATENT OFFICE 2,239,895

WASTE HEAT BOILER

Max H. Kuhner, Worcester, Mass., assignor to Riley Stoker Corporation, Worcester, Mass., a corporation of Massachusetts Application December 15, 1938, Serial No. 245,938

4 Claims. (Cl. 122—7)

This invention relates to waste heat boilers, and more particularly to the construction and arrangement of a boiler adapted to generate steam by the heat of waste gases which are delivered to the boiler at comparatively high pressures.

The invention has practical applications in various industries, but is especially useful in connection with the polymerization process for recovering gasoline. In the performance of this industrial process there is need for a steam boiler which is capable of recovering heat from gases at pressures as high as 50 pounds per square inch, preferably with accurate control of the temperature of the gases leaving the boiler, and it is accordingly the main object of the present invention to provide a waste heat boiler which will operate efficiently under these conditions throughout a long life of useful service.

It is a further object of the invention to provide a comparatively inexpensive waste heat boiler of the water tube type which will be of simple and compact construction and adapted for use with hot gases supplied at pressures substantialy above atmospheric.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a vertical section through a boiler, the section being taken on the line 1—1 of Fig. 2;

Figures 1, 2:
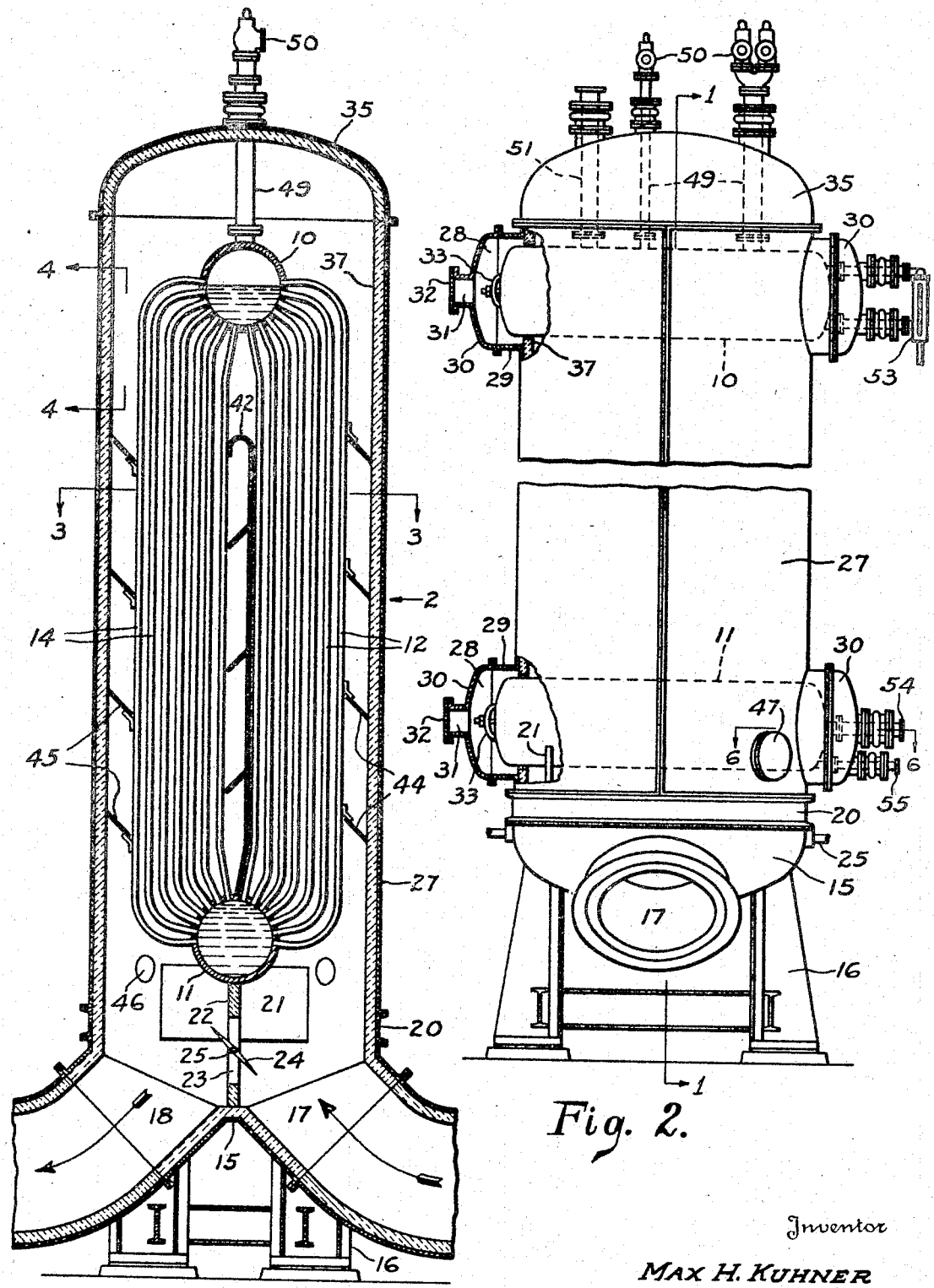
Fig. 2 is an elevation taken in the direction of the arrow 2 in Fig. 1, certain parts being broken away for clearness of illustration.

The embodiment illustrated comprises a horizontal cylindrical steam-and-water drum 10 and a horizontal cylindrical water drum 11 located beneath the drum 10 and parallel thereto. These drums are connected by a bank of upright water tubes 12 and a second bank of upright water tubes 14, the end portions of the tubes being bent to enter the drums radially. The tube banks 12 and 14 are located on opposite sides of the vertical plane which passes through the axes of the drums.

Beneath the lower drum there is provided an upwardly concave head or cap 15, circular in plan and approximately semi-elliptical in vertical section, this member being supported on a suitable framework 16 therebeneath. The head 15 is provided with an inlet passage 17 which slopes upwardly and inwardly beneath the tube bank 12 and an outlet passage 18 which slopes downwardly and outwardly beneath the tube bank 14. On the upper margin of the head 15 there is mounted a horizontal circular ring 20 channel-shaped in cross-section, with the flanges of the channel extending outwardly. Two parallel upright plates 21 are welded or otherwise secured to the ring 20 and extend across the ring in a direction at right angles with the drum 11, the upper edges of these plates being recessed to receive this drum and support the same. Beneath the drum 11 there is provided an upright partition 22 which extends longitudinally of the drum. This partition is formed with an opening 23 therethrough which may be controlled by a damper 24 having an operating shaft 25.

The ring 20 serves to support an upright cylindrical metal casing 27 which surrounds the two banks of water tubes and extends slightly above the upper drum 10. This casing is provided with circular recesses or openings 28 into which the ends of the drums 10 and 11 extend, with ample clearance between these parts. These recesses 28 are formed by short hollow cylinders 29 projecting horizontally from the casing and welded or otherwise secured thereto, the outer ends of the cylinders being closed by outwardly convex caps 30. The caps 30 at one side of the boiler are formed with openings 31 normally closed by cover plates 32, so that access may be had to the clamps 33 of the manhole covers at the adjacent ends of the drums. The casing 27 is closed at the top by an upwardly convex head or cap 35 circular in plan and approximately semi-elliptical in vertical section. As shown particularly in Figs. 2 and 3, the casing is formed of two sections which are separable along a vertical plane extending at right angles to the drums. The joint between the sections is of flanged and bolted construction, and similar joints are provided between the casing 27 and the upper cap 35 and between the casing and the ring 20 therebeneath.

Figures 4, 5:
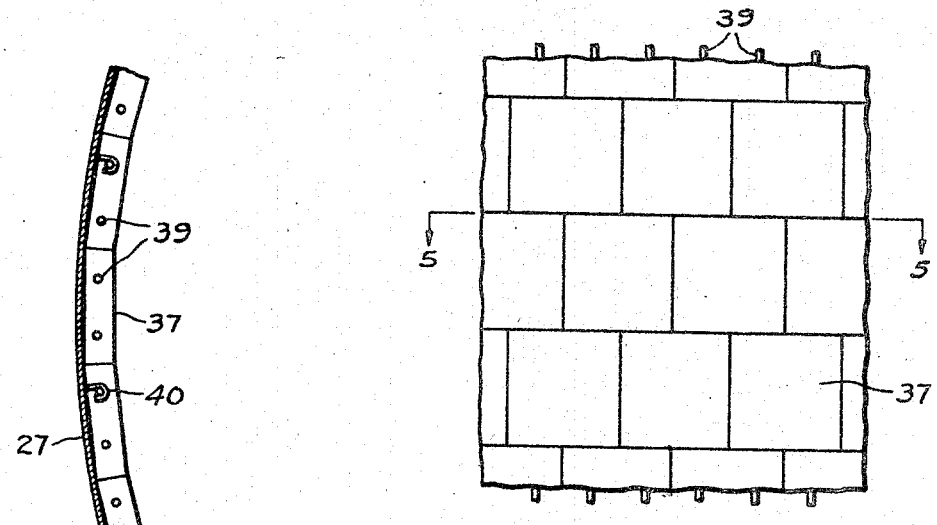
Fig. 4 is a section on the line 4—4 of Fig. 1.
Fig. 5 is a section on the line 5—5 of Fig. 4.

In order to prevent excessive loss of heat by radiation and to protect the metal parts from the hot gases, a lining 37 of suitable refractory insulating material is applied to the inside of the casing 27 and of the heads 15 and 35. This lining may be of monolithic construction, but I prefer to utilize separable blocks, particularly for the portion within the cylindrical casing 27. As shown in Figs. 4 and 5, the blocks may be held in place by vertical metal rods 39 which pass through aligned openings in the blocks, the rods being supported by hooks 40 welded or otherwise secured to the inside of the casing.

Figure 3:
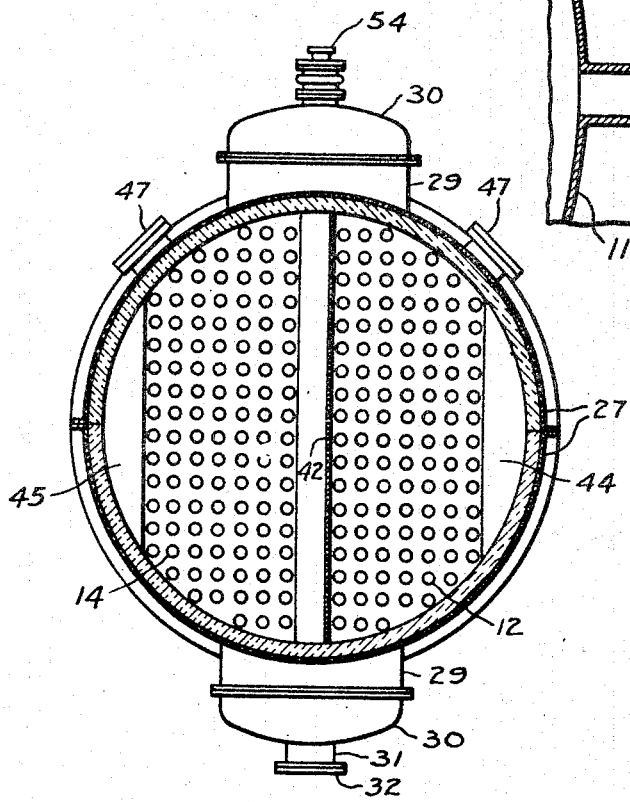
Fig. 3 is a section on the line 3—3 of Fig. 1.

Suitable means is provided to direct the hot gases into contact with the water tubes. For this purpose an upright baffle 42 is mounted between the tube banks 12 and 14, this baffle extending upwardly from the lower drum 11 and terminating somewhat below the upper drum 10. Baffles 44 are provided between the tube bank 12 and the adjacent refractory lining 37, and similar baffles 45 are provided between the tube bank 14 and the refractory lining. These baffles may be secured to the water tubes. It will be noted from Fig. 3 that the baffles 44 and 45 are shaped as circular segments in plan. It will also be noted from this same figure that the rows of water tubes increase in width progressively as they approach the central baffle 42, to conform approximately with the circular shape of the casing 27. Openings 46 (Fig. 1) are provided in the casing 27 to allow access into the space beneath the water tubes, and as shown in Figs. 2 and 3 these openings are normally closed by removable plates 47.

Figure 6:
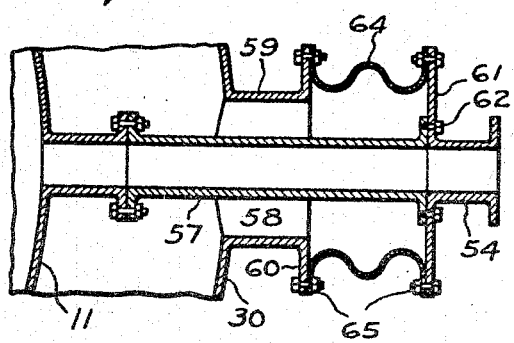
Fig. 6 is an enlarged section on the line 6—6 of Fig. 2.

Pipe connections 49 extend upwardly from the upper drum 10 to safety valves 50, and a pipe connection 51 extends upwardly from the drum 10 to form the main steam outlet of the boiler. At the end of the upper drum 10 opposite the manhole there is provided a gauge glass 53 to indicate the water level in the boiler. At the end of the lower drum 11 opposite the manhole there is provided a feed inlet connection 54 and a blowdown connection 55. These various connections to the drums extend through the adjacent portions of the boiler casing, and a sealed joint is provided between these parts to prevent leakage of hot gases while permitting relative movement of the parts by reason of unequal expansion. For this purpose I utilize the construction shown in detail in Fig. 6, which illustrates the sealing means as applied to the feed connection 54, it being understood that a similar construction is employed for the other connections. As shown in Fig. 6 a pipe or nozzle 57 leads outwardly from the drum 11 through an opening 58 in the casing cap 30, this opening being formed by a nozzle 59 having a flange 60 at its outer end. The feed inlet connection 54 is provided at its inner end with a wide flange 61 which is fastened to the outer end of the pipe 57 by means of screws 62. A corrugated sleeve 64 of comparatively thin flexible metal surrounds the pipe 57 between the flanges 60 and 61, the end portions of the sleeve being fastened to these flanges by suitable bolts 65.

The operation of the invention will now be apparent from the above disclosure. Hot waste gases are delivered to the inlet 17 and flow upwardly in contact with the water tubes 12, over the top of the baffle 42 and thence downwardly in contact with the water tubes 14 to the outlet 18. A portion of the gases may flow through the by-pass opening 23 past the damper 24, which can be adjusted to control the temperature of the gases leaving the boiler. The cylindrical casing 27 is well adapted to withstand high gas pressures, while at the same time confining the gas flow in the manner required for efficient transfer of heat to the tubes. Relative movements of the boiler and casing, caused by unequal expansion or otherwise, will be permitted by the flexible sleeves 64 without application of undue stresses to the boiler connections. The boiler is readily accessible for inspection or repair, it is comparatively simple and inexpensive, and occupies relatively little floor space.

Having thus described my invention, what I claim as new and desire to secure by Letters Patent is:

1. A waste heat boiler comprising an upper horizontal cylindrical steam-and-water drum, a lower cylindrical water drum beneath the upper drum and parallel thereto, a baffle extending upwardly from the lower drum, two banks of upright water tubes connecting the drums and located on opposite sides of the baffle, an upright metal casing enclosing the drums and water tubes, means providing a gas inlet passage adjacent the lower end of one tube bank, means providing a gas outlet passage adjacent the lower end of the other tube bank, a partition beneath the lower drum to separate the inlet passage from the outlet passage, the partition having an opening therein, and a damper to control the opening in the partition.

2. A waste heat boiler comprising an upper horizontal cylindrical steam-and-water drum, a lower cylindrical water drum beneath the upper drum and parallel thereto, a baffle extending upwardly from the lower drum, two banks of upright water tubes connecting the drums and located on opposite sides of the baffle, an upright cylindrical metal casing surrounding the water tubes and constructed to withstand high internal pressures without leakage, the casing being formed with openings into which the end portions of the drums extend, metal caps closing said openings, a metal cap closing the upper end of the casing, a metal cap closing the lower end of the casing and formed with a gas inlet beneath one bank of tubes and a gas outlet beneath the other bank of tubes, a partition beneath the lower drum to separate the inlet from the outlet, the partition having an opening therein, and a damper to control the opening in the partition.

3. A waste heat boiler comprising an upper horizontal cylindrical steam-and-water drum, a lower cylindrical water drum beneath the upper drum and parallel thereto, a baffle extending upwardly from the lower drum, two banks of upright water tubes connecting the drums and located on opposite sides of the baffle, an upright metal enclosure entirely surrounding the drums and water tubes and constructed to withstand high internal pressures without leakage, the enclosure including a metal cap located above the upper drum and a metal cap located beneath the lower drum, means providing a gas inlet passage adjacent the lower end of one tube bank, means providing a gas outlet passage adjacent the lower end of the other tube bank, and a partition beneath the lower drum to separate the inlet passage from the outlet passage.

4. A waste heat boiler comprising an upper horizontal cylindrical steam-and-water drum, a lower cylindrical water drum beneath the upper drum and parallel thereto, a baffle extending upwardly from the lower drum, two banks of upright water tubes connecting the drums and located on opposite sides of the baffle, an upright cylindrical metal casing surrounding the water tubes and constructed to withstand high internal pressures without leakage, the casing being formed with openings into which the end portions of the drums extend, metal caps closing said openings, a metal cap closing the upper end of the casing, a metal cap closing the lower end of the casing and formed with a gas inlet beneath one bank of tubes and a gas outlet beneath the other bank of tubes, and a partition beneath the lower drum to separate the inlet from the outlet.

MAX H. KUHNER